(12) United States Patent
Ashida et al.

(10) Patent No.: US 7,425,312 B2
(45) Date of Patent: Sep. 16, 2008

(54) HYDROCARBON TRAPPING DEVICE

(75) Inventors: Masaaki Ashida, Yokohama (JP); Kouichi Mori, Ayase (JP); Shunichi Mitsuishi, Isehara (JP); Kimiyoshi Nishizawa, Yokohama (JP); Yoshinao Ugomori, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 829 days.

(21) Appl. No.: 10/384,633

(22) Filed: Mar. 11, 2003

(65) Prior Publication Data

US 2003/0202917 A1 Oct. 30, 2003

(30) Foreign Application Priority Data

| Apr. 24, 2002 | (JP) | ............................... 2002-122117 |
| Apr. 24, 2002 | (JP) | ............................... 2002-122118 |

(51) Int. Cl.
*F01N 3/28* (2006.01)
*B01D 53/94* (2006.01)
*B01D 53/72* (2006.01)

(52) U.S. Cl. .................. 422/180; 422/168; 422/170; 422/177; 422/179; 422/171

(58) Field of Classification Search ................. 422/177, 422/178, 180, 171; 502/527.13
See application file for complete search history.

(56) References Cited

U.S. PATENT DOCUMENTS

| 5,744,103 A * | 4/1998 | Yamada et al. ............... 422/171 |
| 6,447,735 B1 | 9/2002 | Yamanashi et al. |
| 2001/0006934 A1 | 7/2001 | Kachi et al. |
| 2002/0119080 A1 * | 8/2002 | Imada et al. ................ 422/168 |

FOREIGN PATENT DOCUMENTS

| EP | 0 976 916 A2 | 2/2000 |
| JP | 56-142212 U | 10/1981 |
| JP | 2-76118 U | 6/1990 |
| JP | 4-179819 A | 6/1992 |
| JP | 4-250855 A | 9/1992 |
| JP | 6-182220 A | 7/1994 |
| JP | 6-262090 A | 9/1994 |
| JP | 07-096183 A | 4/1995 |
| JP | 7-185264 A | 7/1995 |
| JP | 9-085049 A | 3/1997 |
| JP | 10-141047 A | 5/1998 |
| JP | 11-226425 A | 8/1998 |
| JP | 11-290699 A | 10/1999 |
| JP | 2001-179110 A | 7/2001 |
| JP | 2001-182527 A | 7/2001 |

* cited by examiner

*Primary Examiner*—Alexa Neckel
*Assistant Examiner*—Kaity V. Handal
(74) *Attorney, Agent, or Firm*—Foley & Lardner LLP

(57) ABSTRACT

A hydrocarbon trapping layer (25) is formed by coating a hydrocarbon trapping material onto a carrier (21A). A number of exhaust gas passages (34) are formed in the carrier (21A) and a plurality of slits (22) are formed on the carrier (21A) to cross the passages (24) in a transverse orientation. The slits (22) delay temperature increases in the downstream hydrocarbon trapping layer (25) and delay the release of trapped hydrocarbons therefrom. This is due to blocking the transmission of heat to the downstream hydrocarbon trapping layer (25) from the upstream hydrocarbon trapping layer (25). The slits (22) further produce a turbulent flow in the flow of exhaust gas and promote diffusion of exhaust gas over the entire surface of the carrier (21A).

4 Claims, 16 Drawing Sheets

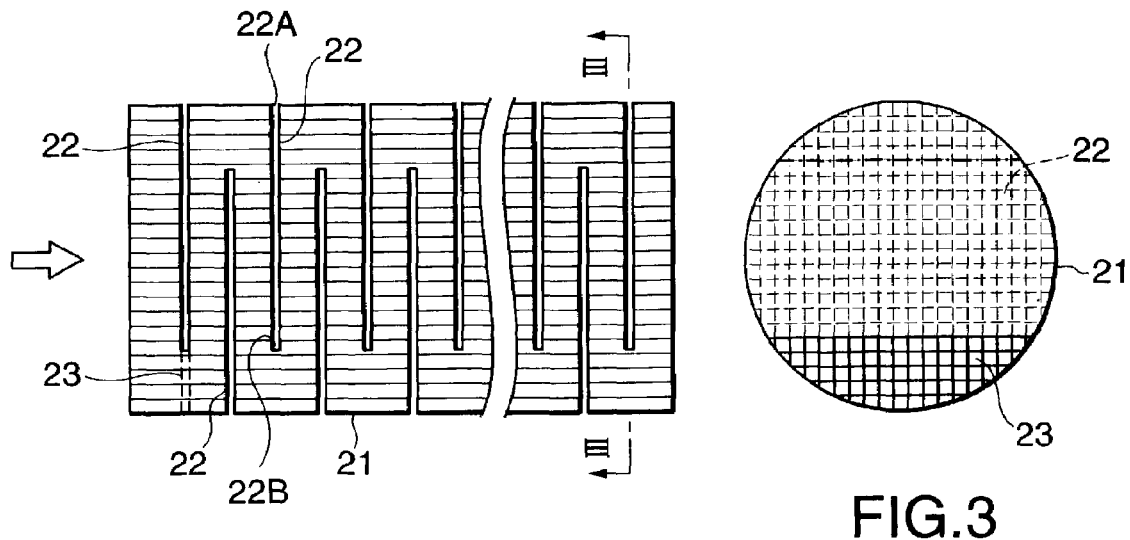
FIG.2
FIG.3
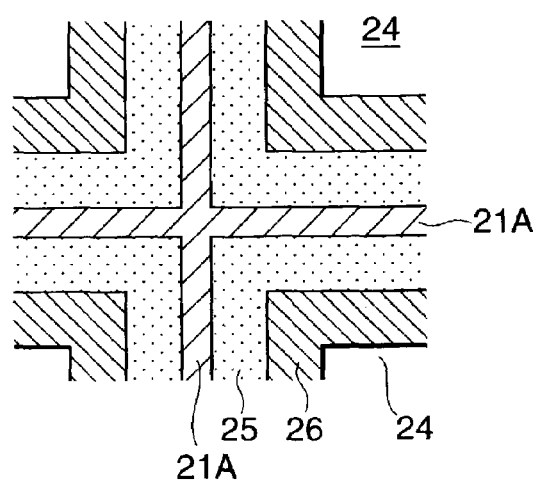
FIG.4

HYDROCARBON TRAPPING DEVICE

FIELD OF THE INVENTION

This invention relates to a trapping device for hydrocarbons which is used in order to purify exhaust gas from an internal combustion engine.

BACKGROUND OF THE INVENTION

An exhaust gas purification system for an internal combustion engine using a three-way catalyst can not sufficiently oxidize hydrocarbons (HC) discharged during cold engine operation conditions due to the fact that the catalyst has not reached an activation temperature.

JP09-085049 published by the Japanese Patent Office in 1998 discloses an HC trap added to an exhaust gas purification system. The HC rap has the function of temporarily trapping HC in exhaust gas from the internal combustion engine. The trapped HC is discharged as the temperature increases. The exhaust gas purification system according to his prior art disposes the HC rap upstream of the three-way catalyst.

When the exhaust gas from the engine has a low temperature, the HC rap in this system traps HC Thereafter when the three-way catalyst has reached an activation temperature, the HC trap releases the trapped HC and the three-way catalyst oxidizes and converts HC released from the HC trap into carbon dioxide ($CO_2$) or steam ($H_2O$).

SUMMARY OF THE INVENTION

However when HC trapped by the trap is released, the temperature of the three-way catalyst often has not reached an optimal activation temperature even through a partial activation temperature has been reached which results in a certain level of activation. Consequently a portion of the HC released from the HC trap is discharged into the atmosphere without undergoing oxidizing operations in the three-way catalyst.

It is therefore an object of this invention to reduce hydrocarbons discharged into the atmosphere as a result of operating an engine at a low temperature.

In order to achieve the above object, this invention provides a hydrocarbon trapping device which is interposed in an exhaust passage of a combustion engine and traps hydrocarbons contained in exhaust gas from the engine in a predetermined temperature range. The device comprises a housing comprising an inlet and an outlet for exhaust gas, a carrier disposed in the housing and forming a plurality of passages for exhaust gas which flows from the inlet to the outlet, and a hydrocarbon trapping layer formed on the carrier. A slit is formed in the carrier in a direction across the passages.

The details as well as other features and advantages of this invention are set forth in the remainder of the specification and are shown in the accompanying drawings.

BRIEF DESCRIPTION OF THE DRAWINGS

FIG. 2 is a side view of a reaction unit according to this invention.

FIG. 3 is a cross-sectional view of the reaction unit taken along the line III-III in FIG. 2.

FIG. 4 is an enlarged cross-sectional view of the reaction unit showing a catalyst layer and a HC trapping layer.

DESCRIPTION OF THE PREFERRED EMBODIMENTS

Figure 1:
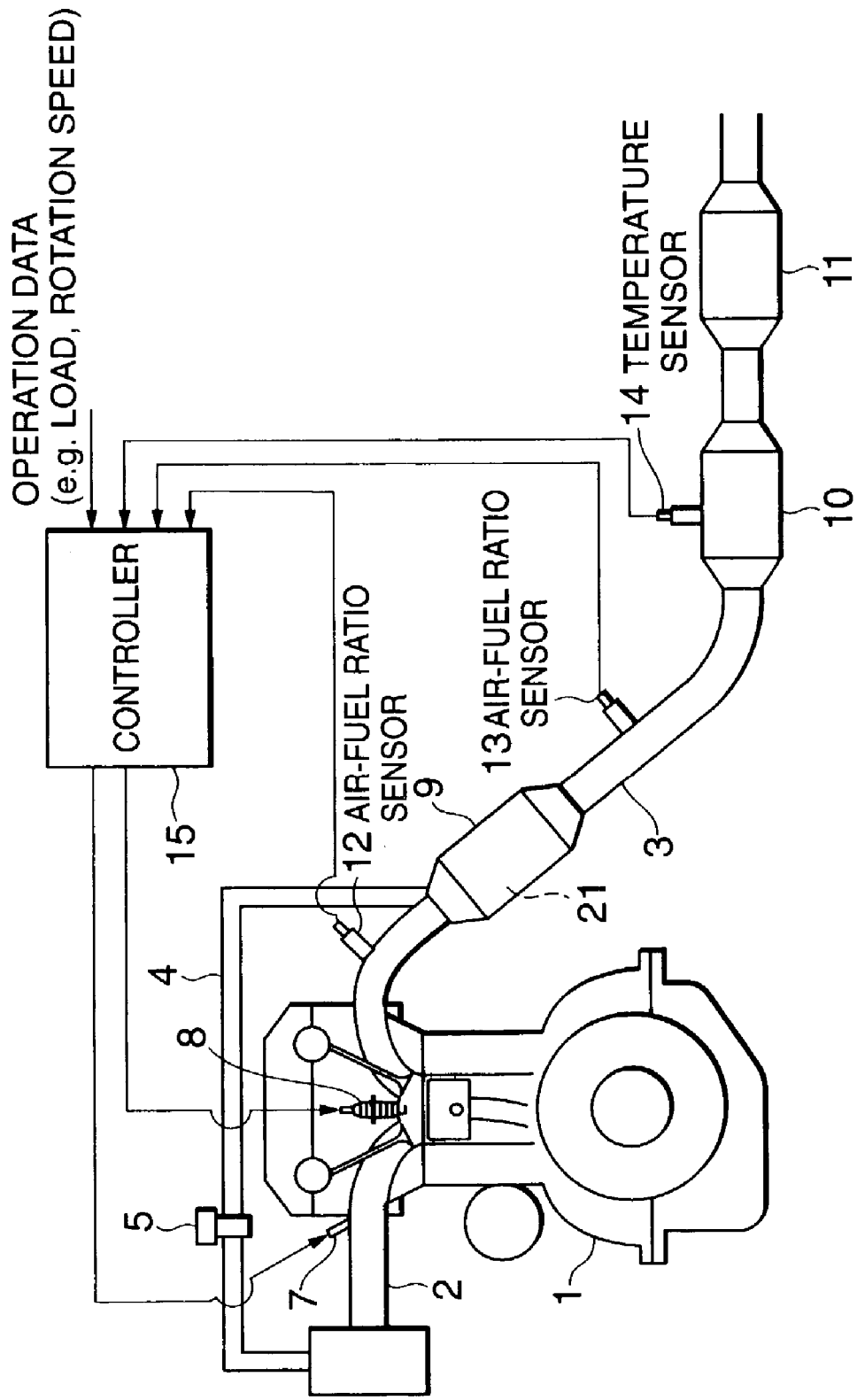
FIG. 1 is a schematic diagram of an engine to which this invention is applied.

Referring to FIG. 1 of the drawings, an internal combustion engine for a vehicle is provided with an intake passage 2 and an exhaust passage 3. A fuel injector 7 injects fuel into air taken into the engine 1 from the intake passage 2. The resulting gaseous mixture is combusted by igniting the gaseous mixture produced in the engine 1 using a spark plug 8.

The exhaust gas produced by combustion of the gaseous mixture is discharged into the atmosphere from the exhaust passage 3 through catalytic converters 9-11. A portion of the exhaust gas is recirculated to the intake passage 2 through an exhaust gas recirculation passage (EGR passage) 4. An EGR control valve 5 is provided in the EGR passage 4 in order to control the exhaust gas recirculation amount.

The catalytic converters 9-11 comprise an upstream catalytic converter 9, an intermediate catalytic converter 10 and a downstream catalyst converter 11 disposed in series. A reaction unit 21 is provided inside each catalytic converter 9-11. The reaction unit 21 is coated with an HC trapping material such as zeolite and a known three-way catalyst having the function of oxidizing carbon monoxide (CO) and hydrocarbons (HC) and reducing nitrogen oxides (NOx). The internal structure of the catalytic converters 9-11 will be described later.

The fuel injection amount and fuel injection timing of the fuel injector 7 and the ignition timing of the spark plug 8 are controlled by a controller 15.

The controller 15 comprises a microcomputer, provided with a central processing unit (CPU), a read-only memory (ROM), a random access memory (RAM) and an input/output interface (I/O interface). The controller 15 may comprise a plurality of microcomputers.

In order to perform the above control, an air-fuel ratio sensor 12, 13 is provided to detect the air-fuel ratio of the gaseous mixture burnt in the engine 1 from the concentration of oxygen in the exhaust gas in the exhaust passage 3 upstream and downstream of the upstream catalytic converter 9. A temperature sensor 14 is provided to detect the catalyst temperature in the intermediate catalytic converter 10. Detection signals from these sensors are input as signal data to the controller 15.

Figure 5:
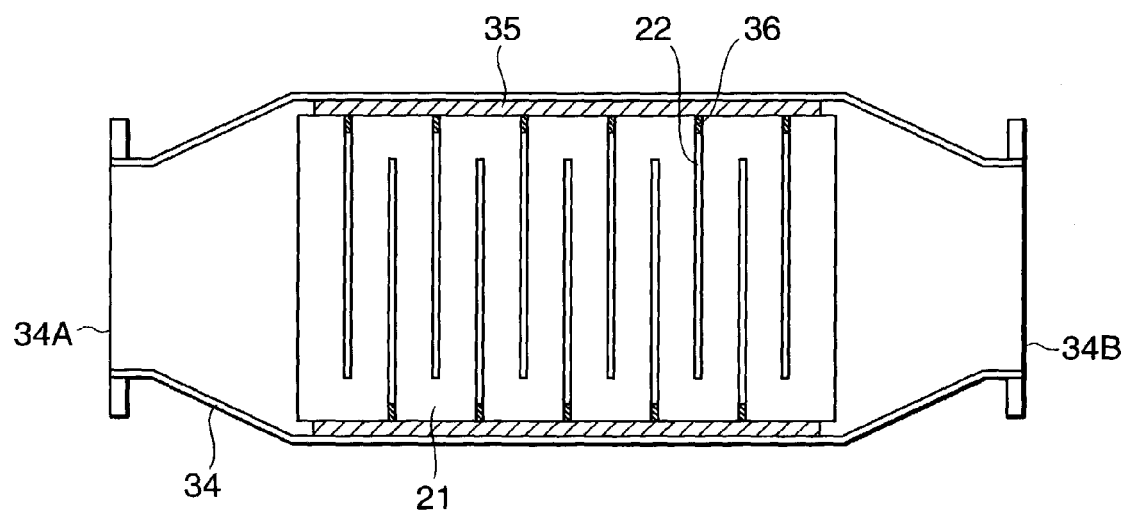
FIG. 5 is a longitudinal sectional view of a catalytic converter according to this invention.

Referring to FIG. 5, the catalytic converter 9 is provided with a cylindrical housing 34 having an inlet 34A and an outlet 34B and the reaction unit 21 supported on the inner side of the housing 34 by a sleeve-shaped thermal resistant mat 35.

Referring to FIG. 3, the reaction unit 21 is provided with a cylindrical carrier 21A which is an integrally molded ceramic body. The carrier 21A has a lattice-shaped cross-sectional face. The space surrounded by the lattice forms a passage 24 for exhaust gas as shown in FIG. 4. Each passage 24 passes longitudinally through the carrier 21A. A catalyst having this type of cross-sectional shape is termed a honeycomb catalyst.

An advantage of forming the carrier 21A by ceramic is that it displays a lower level of heat transfer than metals.

Referring again to FIG. 3, an HC trapping layer 25 and a three-way catalyst layer 26 are formed on the surface of the carrier 21A by coating process. The HC trapping layer 25 is formed by coating a trapping material such as zeolite onto the carrier 21A. The three-way catalyst layer 26 is formed by coating a material containing a metallic catalyst such as platinum (Pt) or rhodium (Rh) onto the HC trapping layer 25.

Next referring to FIG. 2, a plurality of slits 22 are formed in the reaction unit 21 in a direction orthogonal to the flow of exhaust gas shown by the arrow in the figure.

Each slit 22 comprises a notch having an opening 22A on the outer periphery of the reaction unit 21 and having a bottom 22B in proximity to the opposite outer periphery beyond the central section of the reaction unit 21. In FIG. 3, the section shown by the broken-line grid corresponds to the slit 22. The section shown by the solid-line grid corresponds to a non-slit portion 23. The dot-dash line on the upper section of the figure shows the bottom of the adjacent slit 22. In other words, two adjacent slits are formed in opposite directions. The slits 22 are formed at equal intervals relative to the direction of flow of exhaust gas shown by the arrow in FIG. 2.

As described above, when the carrier 21A is formed from ceramic, the slits 22 are formed by grinding after the carrier 21A is sintered.

Referring again to FIG. 5, the openings facing the thermal resistant mat 35 of the slit 21 are closed using a plug 36. The plug 36 has the function of protecting the thermal resistant mat 35 from erosion as a result of exposure to the exhaust gas in the slit 22. A material which has the same coefficient of linear expansion as the carrier 21A is used in the plug 36 in order to maintain the structural strength of the reaction unit 21 by reducing the strain which may appear when the reaction unit 21 is heated.

In this embodiment, although only the catalytic converter 9 which undergoes the highest temperatures is formed as described above, all the catalytic converters 9-11 may be formed in the above manner.

Next referring to FIGS. 6A-6E, the exhaust gas composition when starting up the engine 1 under cold conditions with the upstream catalytic converter 9 constructed as described above will be described.

Figure 6:
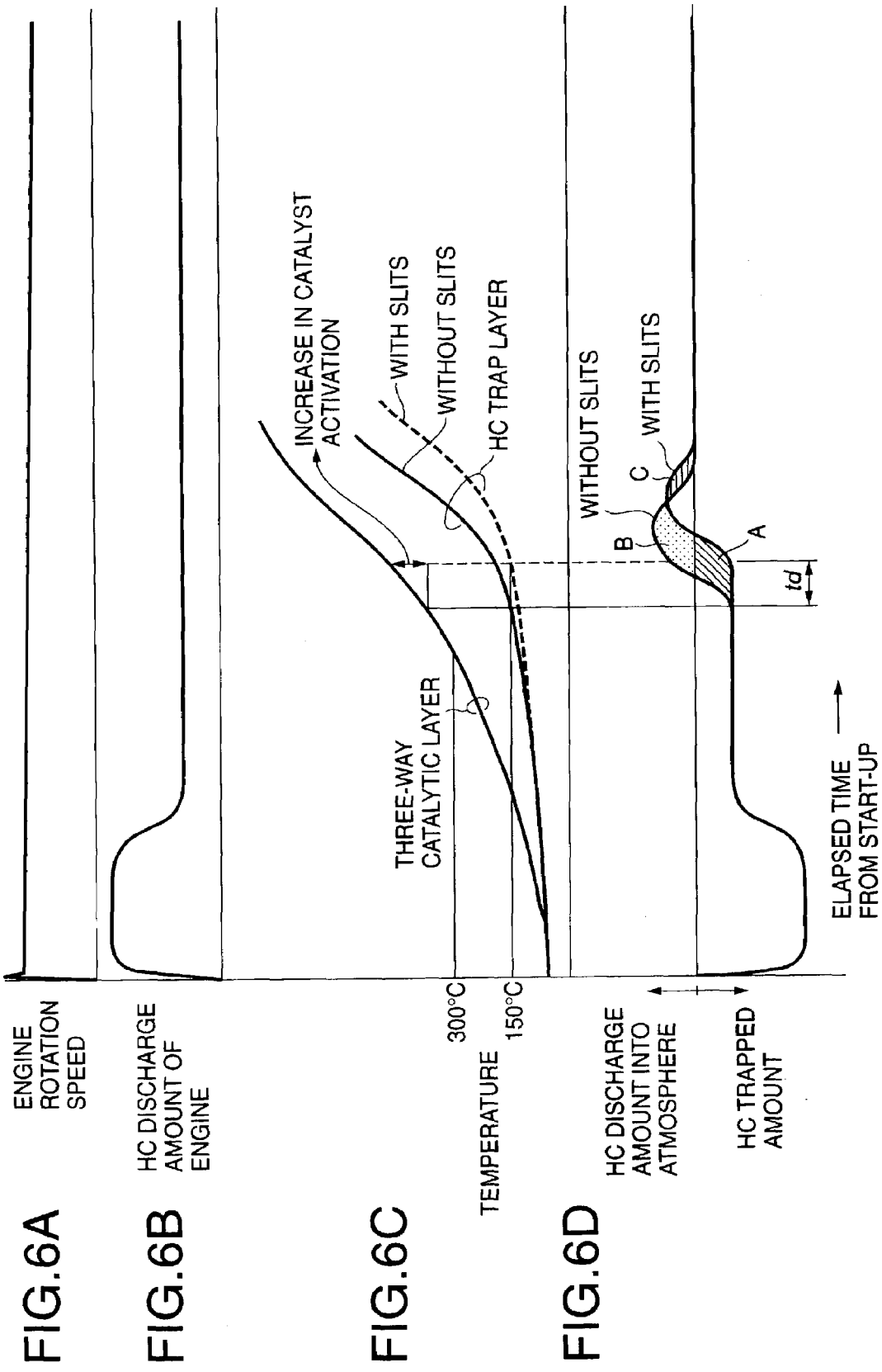
FIGS. 6A-6D are timing charts describing characteristics with respect to HC trapping and HC releasing of the catalytic converter.

As described in FIG. 6A, when the engine 1 started at a low temperature, as shown in FIG. 6B, a large amount of HC is discharged into the exhaust passage 3 in comparison to the amount discharged during operation at a stable idle rotation speed. This is due to unburnt fuel or incomplete combustion of fuel. HC discharged to the exhaust passage 3 is trapped by the HC trapping layer 25 in the upstream catalytic converter 9.

Thereafter as shown in FIG. 6C, when the temperature of the trapping layer 25 reaches 150 degrees centigrade (° C.), the trapping layer 25 starts to release trapped HC. Conversely when the three-way catalyst layer 26 exceeds a temperature of 300° C., oxidation reactions on HC start to occur. However the catalytic function of the three-way catalyst is not evident over the entire catalyst surface at a temperature of 300° C. At this stage the catalytic function is only partially evident. In other words, when the catalytic function of the three-way catalyst 26 is considered, a temperature of 300° C. is a partial activation temperature and the complete activation occurs in regions of higher temperature.

Consequently immediately after the three-way catalyst 26 has reached a temperature of 300° C., the oxidizing performance of the three-way catalyst 26 with respect to HC is still relatively low. The oxidizing performance of the three-way catalyst 26 with respect to HC increases as the temperature of the three-way catalyst 26 increases further, in other words, it increases with the passage of time.

Consequently it is preferred that the release of HC from the HC trapping layer 25 is delayed as much as possible from the point of view of ensuring sufficient oxidizing of the HC released from the HC trapping layer 25. On the other hand, it is preferred to increase the temperature of the three-way catalyst layer 26 to the complete activation temperature as rapidly as possible after reaching the partial activation temperature of 300° C.

The formation of the slits 22 on the reaction unit 21 has the following effect on the above requirements.

The temperature of the three-way catalyst layer 26 formed on the surface of the HC trapping layer 25 mainly increases as a result of direct contact with high-temperature exhaust gas. Furthermore after initiating catalytic reactions, the heat of reaction increases the rate of change in temperature.

Thus it is preferable that the heat capacity of the three-way catalyst 26 is small from the point of view of ensuring a rapid increase in the temperature of the three-way catalyst layer 26.

On the other hand, the HC trapping layer 25 positioned in the lower layer mainly undergoes temperature increases as a result of transmission of heat from the upstream HC trapping layer 25.

Due to the slits 22 formed on the reaction unit 21A, transmission of heat from the HC trapping layer 25 ceases and the heat capacity of the three-way catalyst layer 26 becomes small. As a result, an overall delay occurs in the temperature increase of the HC trapping layer 25, while the temperature increase in the three-way catalyst layer 26 is promoted.

When the temperature increase of the HC trapping layer 25 is delayed, the HC trapping period of the HC trapping layer 25 is lengthened and release of the trapped HC is delayed. Conversely promoting temperature increases in the three-way catalyst layer 26 improves the oxidizing performance for HC released from the HC trapping layer 25.

Referring to FIGS. 6A-6D there is a time differential td until the average temperature of the HC trapping layer 25 reaches the HC release start-up temperature of 150° C. This time delay occurs between the reaction unit 21 which has the slits 22 and the reaction unit which is not provided with the slits 22. The lower part of the curve with respect to the center line in FIG. 6D represents the HC trapping amount per unit time by the HC trapping layer 25. The upper part of the curve with respect to the center line represents the amount of HC per unit time which is discharged to the atmosphere without undergoing oxidizing processes of the HC which is released from the HC trapping layer 25.

The surface area of the HC region A corresponds to the HC trapping amount of the reaction unit 21 during the time differential td. The difference in surface area of the region B and the region C corresponds to the difference in the HC amount discharged into the atmosphere from the reaction unit 21 with slits 22 and from a reaction unit without slits 22.

As shown in the figures, the three-way catalyst layer 26 undergoes a temperature increase during the time differential td. Thus the temperature of the three-way catalyst layer 26 in the reaction units 21 which have slits 22 when the HC trapping layer 25 releases HC is higher than the temperature of the reaction units without slits 22.

Consequently the processing performance of the three-way catalyst layer 26 on released HC is correspondingly higher. Thus the region C is normally smaller than the region B.

Furthermore exhaust gas flowing downstream in the reaction unit 21 undergoes turbulent flow when passing through the slits 22. This turbulent flow improves the trapping efficiency for HC in the exhaust gas by the trapping layer 25.

The HC processing performance of the three-way catalyst layer 26 is also stabilized by the effect of the slits 22 which smooth out temperature deviations in the three-way catalyst layer 26 in the radial direction of the reaction unit 21.

The provision of slits 22 in the reaction unit 21 results in the preferred action of suppressing the amount of HC discharged into atmosphere during cold start-up of the engine 1 as shown by the difference between region B and region C in FIG. 6E.

It is a simple operation to form a plurality of slits 22 orthogonal to the direction of flow of exhaust gas in the reaction unit 21. Since the outer periphery of the reaction unit 21 is supported across the whole surface by a housing 34 through the heat-resistant mat 35, the structural strength of the reaction units 21 is not adversely affected as a result of forming the slits 22. Since the slits 22 are formed at equal intervals, the contact time between HC and the trapping layer 25 in each section of the reaction unit 21 divided by the slits 22 is constant irrespective of the exhaust gas temperature. As a result, control of the HC trapping amount in the trapping layer 25 is also facilitated.

It is advantageous to provide a number of slits 22 from the point of view of suppressing transmission of heat in the HC trapping layer 25 and increasing the turbulence in the flow of the exhaust gas.

Even when the carrier 21A is formed from a metallic material, it is possible to obtain an appropriate level of suppressing heat transmission by forming the slits 22 in a carrier made of metallic material. However, the effect of the slits according to this invention is more significant when they are provided in a ceramic carrier that has a lower heat transfer rate. Ceramics display an affinity for HC trapping materials such as zeolite and have the advantage that the strength of layers formed by coating is higher than in the case when they are formed on the surface of metal carrier.

The HC trapping amount of the HC trapping layer 25 depends on the coating amount of the HC trapping material on the carrier 21A.

However when a large amount of trapping material is coated on the carrier 21A, the cross-sectional area of the passage 24 is reduced and the flow resistance on the exhaust gas increases. However, if the HC trapping performance of the HC trapping layer 25 is improved by the aforesaid turbulence promotion effect and heat transfer prevention effect of the slits 22, it is possible to suppress the flow resistance on the exhaust gas at a low level, because the coating amount of HC trapping material, i.e., the thickness of HC trapping layer 25 for coating can be maintained small.

More precisely, the density of the passages in the catalyst unit that is to say, the cell density of the carrier is generally 900 nos. per square inch. A reaction unit 21 according to this invention allows a reduction to 600 nos. per square inch or even to 300 nos. per square inch as a result of the effect.

With respect to a cell density of 300 nos. per square inch, the amount of trapping material coated on the carrier 21A is preferably 350 grams per cubic foot in gross (apparent) volume of the carrier 21A. With respect to a cell density of 600 nos. per square inch, the amount of trapping material coated on the carrier 21A is preferably 250 grams per cubic foot in gross (apparent) volume of the carrier 21A.

It is possible to make the cell density of the intermediate catalytic converter 10 and the downstream catalytic converter 11 smaller than the cell density of the upstream catalytic converter 9 in order for reducing the exhaust gas flow resistance of the exhaust gas passage 3. The intermediate catalytic converter 10 and the downstream catalytic converter 11 have a delay in temperature increase compared with the upstream catalytic converter 9 when the starting the engine 1 under cold conditions.

More time is therefore required in these converters 10, 11 in order for the three-way catalyst to reach an activation temperature. However when the HC trapping performance of the upstream catalytic converter 9 is enhanced as a result of applying this invention, it is possible to reduce the exhaust gas flow resistance in the entire exhaust passage 3 while maintaining the exhaust gas purification performance. Consequently the cell density of the intermediate catalytic converter 10 and the downstream catalytic converter 11 can be reduced without affecting the over all exhaust gas purification performance.

Instead of forming the slits 22, it is possible to increase the HC purification performance during low temperature operation by dividing the reaction unit 21 into a plurality of independent units with respect to the longitudinal cross-section and disposing these units in series at intervals with respect to the direction of flow of exhaust gas. However when a single reaction unit is compared with a plurality of independent units, a plurality of slits 22 formed in a single reaction unit 21 displays advantages with respect to durability or structural strength of the reaction unit and the required number of assembly operations for the catalytic converters.

This embodiment deals with a reaction unit 21 in which the three-way catalyst layer 26 is coated on the HC trapping layer 25. However this invention can also be applied to a reaction unit in which only the HC trapping layer 25 is coated onto the carrier 21A, that is to say, a reaction unit only for the purpose of trapping HC. The prior-art exhaust gas purification device disclosed in the aforesaid JP9-087049 comprises this type of reaction unit and a three-way catalytic converter disposed downstream thereof.

In this situation, the formation of the slits 22 in the reaction unit has the following effect. The HC trapping layer 25 comes into direct contact with high-temperature exhaust gas. Although the surface layer of the HC trapping layer 25 undergoes a direct temperature increase due to of the heat of the exhaust gas, the temperature increase in the HC trapping layer 25 in sections other than the surface layer continues to be strongly related to the transmission of heat from the upstream HC trapping layer 25. In contrast to the three-way catalyst layer 26, since the HC trapping layer 25 does not perform catalytic reactions, there is no temperature increase related to the heat of reaction.

Consequently the effect of suppressing temperature increases in the HC trapping layer 25 due to preventing the transmission of heat in the HC trapping layer 25 is greater than the effect of promoting temperature increases in the surface sections of the HC trapping layer 25 resulting from the reduction in the heat capacity. This results in an overall delay in the temperature increase in the reaction unit. This delay increases the HC trapping amount in the HC trapping layer 25 and delays the release of trapped HC. Since the temperature of the downstream three-way catalytic converter undergoes a greater increase as a result of the delay in the release of trapped HC, more efficient oxidation of the released HC is ensured.

Next referring to FIG. 7, a second embodiment of this invention related to the disposition of the slits 22 will be described. With respect to the flow of exhaust gas, the reaction units 21 shown in FIGS. 7-44 are all shown as upstream on the left side of the figure and downstream on the right side. The structure of the cross-section of the reaction unit 21 is the same as the structure according to the first embodiment as shown in FIG. 4.

Figure 7:
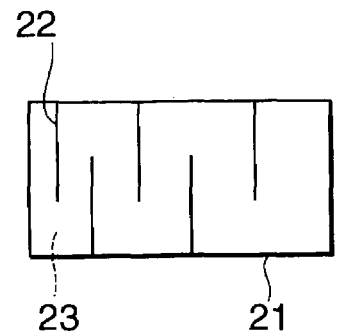
FIG. 7 is a schematic side view of a reaction unit according to a second embodiment of this invention.

Referring to FIG. 7, the distance between adjacent slits 22 decreases upstream of the reaction units 21.

Thus according to this embodiment, turbulent flow in the upstream section of the reaction unit 21 is promoted in comparison to disposing the slits 22 at equal intervals. Since transmission of heat is more effectively stopped in upstream sections of the HC trapping layer 25, it is possible to more effectively suppress increases in the average temperature of the HC trapping layer 25 in the overall reaction unit 21. Furthermore the delay in the release of HC from the HC trapping layer 25 and the increase in the HC trapping amount in the HC trapping layer 25 are conspicuously increased.

Since the heat capacity of the three-way catalyst layer 26 decreases in the upstream section which displays a high density of slits 22, the three-way catalyst layer 26 in this section is activated by the more rapid temperature increases. Consequently it is possible to ensure oxidation of HC released from the HC trapping layer 25.

Figure 8:
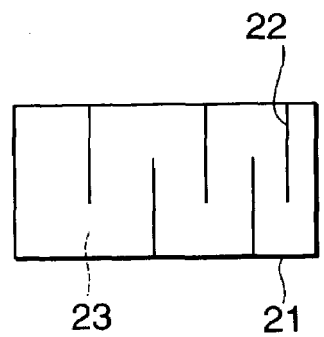
FIG. 8 is a schematic side view of a reaction unit according to a third embodiment of this invention.

A third embodiment of this invention will be described referring to FIG. 8.

In this embodiment, the distance between adjacent slits 22 progressively decreases downstream of the reaction unit 21 in the opposite manner to the second embodiment.

In this embodiment, since the heat capacity of the three-way catalyst 26 downstream of the reaction unit 21 decreases, it is possible to prevent a delay in the temperature increase in the three-way catalyst layer 26 at that position.

Figure 9:
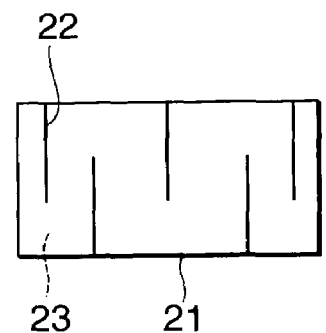
FIG. 9 is a schematic side view of a reaction unit according to a fourth embodiment of this invention.

A fourth embodiment of this invention will be described referring to FIG. 9.

In this embodiment, the interval between the slits 22 in downstream and upstream sections of the reaction unit 21 is small. The interval between the slits 22 in the intermediate section is large. This setting allows temperature increases to be suppressed in the three-way catalyst layer 26 in the intermediate section which has a low density of slits 22.

Figure 10:
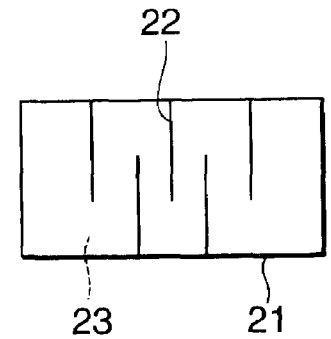
FIG. 10 is a schematic side view of a reaction unit according to a fifth embodiment of this invention.

A fifth embodiment of this invention will be described referring to FIG. 10.

In this embodiment, the interval between the slits 22 in the upstream and the downstream sections of the reaction unit 21 is large and the interval between slits 22 in the intermediate section is small in the opposite manner to the fourth embodiment. This setting allows temperature increases to be promoted in the three-way catalyst layer 26 in the intermediate section which has a high density of slits 22.

The second embodiment achieves the opposite effect from the third embodiment. Furthermore the fourth embodiment achieves the opposite effect from the fifth embodiment. Consequently it is possible to regulate HC trapping operations and oxidizing operations on trapped HC in order to obtain optimal characteristics in the overall exhaust gas purification system. This is realized by selecting the position of the slits 22 in the second through fifth embodiments in response to differences in the characteristics of the catalytic converters 9-11.

Figure 11:
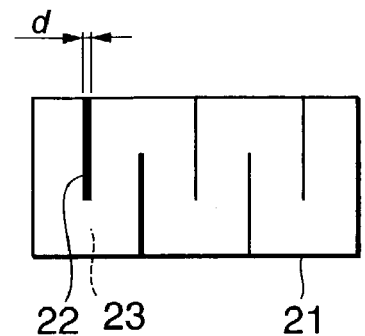
FIG. 11 is a schematic side view of a reaction unit according to a sixth embodiment of this invention.

A sixth embodiment of this invention will be described referring to FIG. 11.

In this embodiment, the interval for slits 22 is fixed and the width d of the slits 22, i.e., the dimension in the direction of the exhaust gas flow, in the upstream sections of the reaction unit 21 is set wider than the that of the slits 22 in the intermediate and downstream sections.

According to this embodiment, turbulence in the flow of exhaust gas undergoes a relative increase in upstream section of the reaction unit 21 and blocking of heat transfer is improved. When turbulence in the exhaust gas in the upstream section is promoted, a more uniform distribution is obtained in the downstream flow amount of the exhaust gas in a radial direction. When the distribution of the flow amount is uniform, both the HC trapping performance of the HC trapping layer 25 and the HC oxidizing performance of the three-way catalyst layer 26 are improved.

Figure 12:
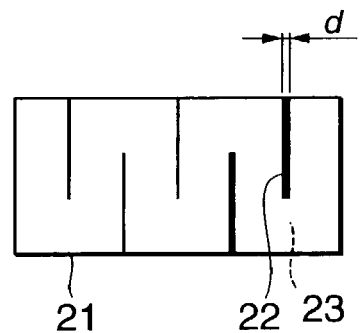
FIG. 12 is a schematic side view of a reaction unit according to a seventh embodiment of this invention.

A seventh embodiment of this invention will be described referring to FIG. 12.

In this embodiment, the width d of the slits 22 in the downstream section of the reaction unit 21 is set to be larger than that of the slits 22 in upstream and intermediate sections in the opposite manner to the sixth embodiment. In particular, according to this embodiment, it is possible to suppress temperature increases in the HC trapping layer 25 in the downstream section of the reaction unit 21.

Figure 13:
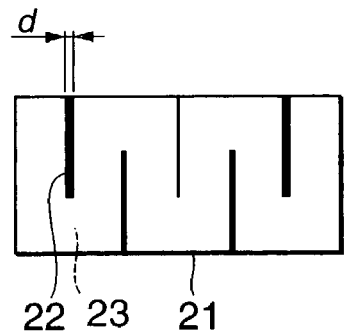
FIG. 13 is a schematic side view of a reaction unit according to an eighth embodiment of this invention.

An eighth embodiment of this invention will be described referring to FIG. 13.

In this embodiment, the width d of the slits 22 in the downstream section and upstream section of the reaction unit 21 is set to be larger than that of the slits 22 in the intermediate section. This setting improves blocking of heat transfer and increases the turbulence of the exhaust gas flow in the upstream and downstream sections of the reaction unit 21.

Figure 14:
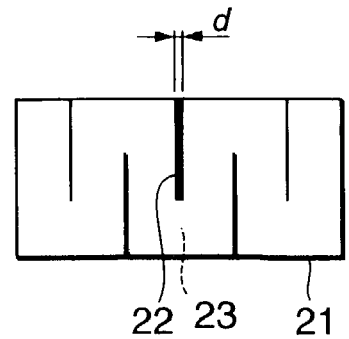
FIG. 14 is a schematic side view of a reaction unit according to a ninth embodiment of this invention.

A ninth embodiment of this invention will be described referring to FIG. 14.

In this embodiment, the width d of the slits 22 in the intermediate section of the reaction unit 21 is set to be larger than that of the slits 22 in the upstream and upstream section in the opposite manner to the eighth embodiment. This setting improves blocking of heat transfer and increases the turbulence of the exhaust gas flow in the intermediate section of the reaction unit 21.

The sixth embodiment achieves the opposite effect from the seventh embodiment. Furthermore the eighth embodiment achieves the opposite effect from the ninth embodiment. Consequently it is possible to regulate HC trapping operations and oxidizing operations on trapped HC in order to obtain optimal characteristics in the overall exhaust gas purification system. This is achieved by varying the width d of the slits 22 in response to the position of the slits 22 as shown by the sixth through the ninth embodiments and adapts differences in the characteristics of the catalytic converters 9-11.

Figure 15:
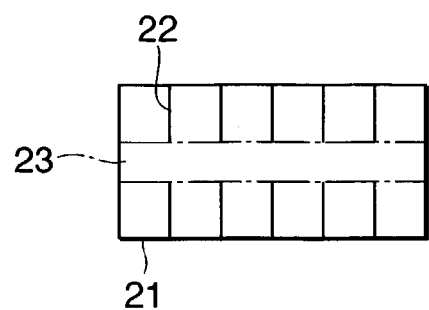
FIG. 15 is a schematic side view of a reaction unit according to a tenth embodiment of this invention.

A tenth embodiment of this invention will be described referring to FIG. 15.

In this embodiment, the non-slit portion 23 is provided in the center of the cross sectional face of the reaction unit 21. A pair of slits 22 is formed on both sides of the non-slit portion 23. The pair of slits 22 is positioned at the longitudinal position of the reaction unit 21 orthogonal to the flow of exhaust gas. According to this embodiment, since the non-slit portion 23 is positioned in the center of the reaction unit 21, the structural strength of the reaction unit 21 can be easily maintained.

Figure 16:
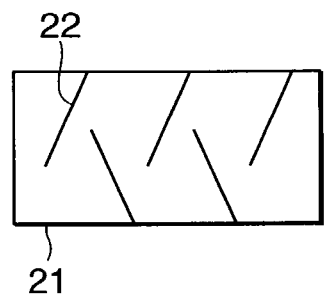
FIG. 16 is a schematic side view of a reaction unit according to an eleventh embodiment of this invention.

An eleventh embodiment of this invention will be described referring to FIG. 16.

In each of the first to the tenth embodiments, the slits 22 were formed orthogonal to the direction of exhaust gas flow. In this embodiment, as shown in the figure, the slits 22 are inclined and the end of the slits 22 is positioned further upstream than the opening of the slit 22. The depth of the slits 22 is set so that a section of two adjacent slits 22 overlaps with respect to the direction of exhaust gas flow.

According to this embodiment, the flow of exhaust gas in the reaction unit 21 is lead by the slits 22 in the radial direction from the central section of the reaction unit 21 by the slits 22. As a result, the flow of exhaust gas diffuses over the entire surface of the cross-section of the reaction unit 21 and does not concentrate in the center of the reaction unit 21. Thus it is possible to ensure the performance of the HC trapping layer 25 and the three-way catalyst layer 26.

Figure 17:
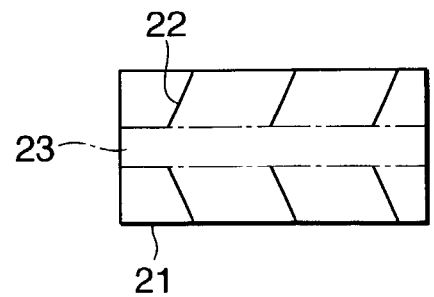
FIG. 17 is a schematic side view of a reaction unit according to a twelfth embodiment of this invention.

A twelfth embodiment of this invention will be described referring to FIG. 17.

In this embodiment, the pair of slits 22 in the reaction unit 21 according to the tenth embodiment are modified so that the slits incline as described in the eleventh embodiment. The position of the end and the opening of one of the pair of the slits 22 in the direction of exhaust gas flow is the same as the other one of the pair of the slits 22.

According to this embodiment, the strength of the reaction unit 21 is ensured in the same manner as the tenth embodiment. Furthermore it is possible for the flow of exhaust gas to diffuse in the radial direction in the same manner as the eleventh embodiment.

Figure 18:
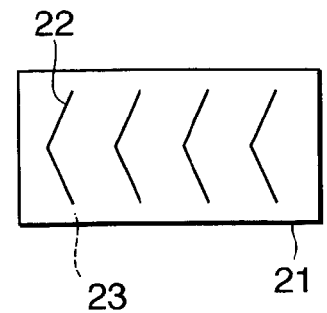
FIG. 18 is a schematic side view of a reaction unit according to a thirteenth embodiment of this invention.

A thirteenth embodiment of this invention will be described referring to FIG. 18.

In the first to the twelfth embodiments, the slits 22 comprised notches formed on the carrier 21A. In this embodiment, the slits 22 are formed as through holes which laterally pass through the carrier 21A. When the cross-section of the slits 22 is viewed from the direction of piercing, the slits 22 bend sharply and project against the flow of exhaust gas as shown in the center of the figure. The non-slit portion 23 is provided above and below the slits 22 as shown in the figure.

In this embodiment, since the non-slit portion 23 is provided on both sides of the slits 22 with respect to the lateral direction of the reaction unit 21, reduction in the structural strength of the reaction unit 21 resulting from the formation of the slits 22 is small. Furthermore exhaust gas flowing downstream in proximity to the center of the reaction unit 21 is lead towards an upper part and lower part of the reaction unit 21 by the slits 22, since the center of the cross-section of the slits 22 projects against the flow of exhaust gas. As a result, it is possible to diffuse the flow of exhaust gas from the center of the reaction unit 21 to the outer side of the reaction unit 21.

Figure 19:
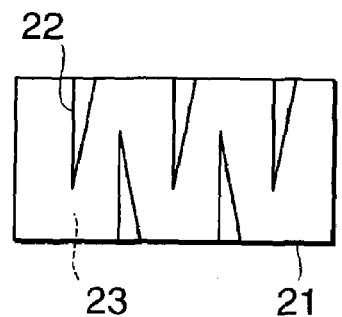
FIG. 19 is a schematic side view of a reaction unit according to a fourteenth embodiment of this invention.

A fourteenth embodiment of this invention will be described referring to FIG. 19.

In this embodiment, the eleventh embodiment is modified so that the dimension of the slit 22 with respect to the direction of exhaust gas flow are increased at the opening 22A and are decreased towards the bottom 22B. The depth of the notch is set so that a section of adjacent slits 22 overlaps with respect to the flow of exhaust gas.

According to this embodiment, since the dimensions of the slit 22 with respect to the direction of exhaust gas flow are increased in proximity to the outer periphery of the reaction unit 21, it is possible to further improve the diffusion of exhaust gas flow in the radial direction in comparison to the eleventh embodiment.

Figure 20:
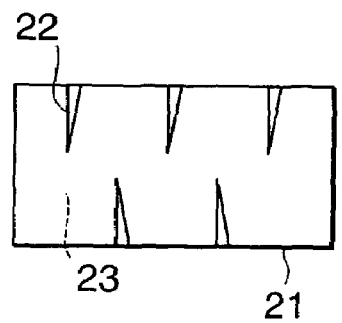
FIG. 20 is a schematic side view of a reaction unit according to a fifteenth embodiment of this invention.

A fifteenth embodiment of this invention will be described referring to FIG. 20.

In this embodiment, the fourteenth embodiment is modified so that the depth of the slits 22 is reduced such that there is not overlapping portion between adjacent slits 22 with respect to the direction of exhaust gas flow. According to this embodiment, since the proportion of the non-slit portion 23 is increased, the structural strength of the reaction unit 21 is higher than the fourteenth embodiment.

Figure 21:
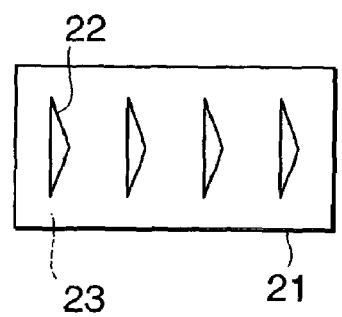
FIG. 21 is a schematic side view of a reaction unit according to a sixteenth embodiment of this invention.

A sixteenth embodiment of this invention will be described referring to FIG. 21.

The reaction unit 21 according to this embodiment forms the slits 22 with a plurality of through holes which laterally pass through the reaction unit 21 in the same manner as the thirteenth embodiment. However unlike the thirteenth embodiment, the cross-section of the slits 22 in this embodiment is formed as an isosceles triangle so that the width of the slits 22 increases towards the center. According to this embodiment, turbulence in the exhaust gas increases at the center of the slit 22 which makes it possible to further promote the diffusion of the flow of exhaust gas. Since the non-slit portion 23 is provided on both sides of the slit 22, it is possible to suppress reductions in the structural strength of the reaction unit 21 resulting from the formation of the slits 22.

Figure 22:
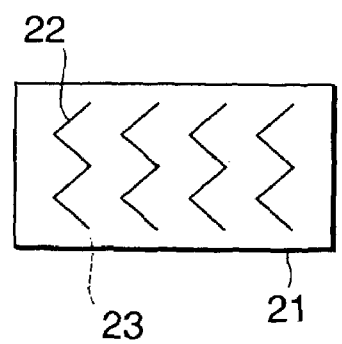
FIG. 22 is a schematic side view of a reaction unit according to a seventeenth embodiment of this invention.

A seventeenth embodiment of this invention will be described referring to FIG. 22.

This embodiment similar to the thirteenth embodiment, but the cross-sectional shape of each slit 22 is modified to have two vertices facing the flow of exhaust gas. The slits 22 laterally pass through the reaction unit 21 in the same manner as the thirteenth embodiment. According to this embodiment, it is possible to further promote the diffusion of exhaust gas in a radial direction as a result of turbulence by increasing the complexity of the flow of exhaust gas within the reaction unit 21. In the same manner as the thirteenth embodiment, since the non-slit portion 23 is provided on both sides of the slits 22, it is possible to suppress reductions in the structural strength of the reaction unit 21 resulting from formation of the slits 22.

Figure 23:
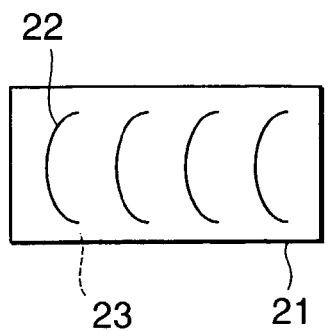
FIG. 23 is a schematic side view of a reaction unit according to an eighteenth embodiment of this invention.

An eighteenth embodiment of this invention will be described referring to FIG. 23.

This embodiment is also similar to the thirteenth embodiment, but the cross-sectional shape of the slits 22 is modified from a sharply bent shape to a curved shape. According to this embodiment, in addition to the same effect as the thirteenth embodiment, since there is not an acute-angle bend in the slit 22, stresses are not concentrated when vibrations or shocks are applied to the reaction unit 21. Thus it is possible to further suppress reductions in the structural strength of the reaction unit 21 resulting from the formation of slits 22.

FIGS. 24-33 show nineteenth through twenty-eighth embodiments of this invention related to the amount of catalyst involved in the three-way catalyst layer 26 or the amount of HC trapping material in the HC trapping layer 25. The amount is represented by the weight or density of metallic catalyst or HC trapping material.

Figure 24:
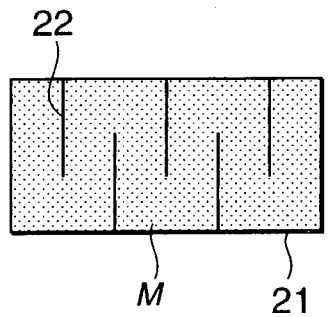
FIG. 24 is a schematic side view of a reaction unit according to a nineteenth embodiment of this invention.

Firstly the nineteenth embodiment will be described referring to FIG. 24.

In this embodiment, the catalyst amount M in the three-way catalyst layer 26 is constant across the entire surface of the carrier 21A. According to this embodiment, it is possible to obtain stable preferred exhaust gas purification performance under various conditions as a result of the creation of turbulent flow by the slits 22 on the flow of exhaust gas and the blocking of heat transfer by the HC trapping layer 25.

Figure 25:
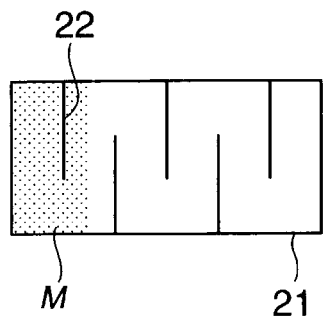
FIG. 25 is a schematic side view of a reaction unit according to a twentieth embodiment of this invention.

A twentieth embodiment will be described referring to FIG. 25.

In this embodiment, the catalyst amount M in the upstream section of the reaction unit 21 is greater than in other sections. According to this embodiment, since catalyst-mediated reactions on the exhaust gas are advanced due to the provision of large amount of catalyst in the upstream section of the reaction unit 21, the activation of the three-way catalyst layer 26 in this section is advanced. Thus during cold-start conditions of the engine 1, it is possible to advance the oxidizing of HC which is released from the HC trapping layer 25. The increase in the temperature of the three-way catalyst layer 26 in the upstream section does not tend to be transferred downstream due to blockage by the slits 22. Thus the HC trapping performance of the downstream HC trapping layer 25 is not adversely affected by this arrangement.

Figure 26:
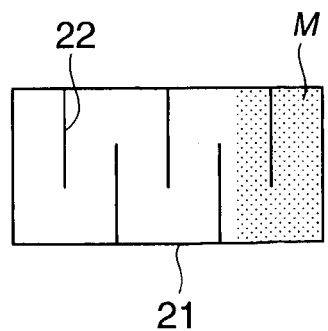
FIG. 26 is a schematic side view of a reaction, unit according to a twenty-first embodiment of this invention.

The twenty-first embodiment will be described referring to FIG. 26.

In this embodiment, the catalyst amount M in the downstream section of the reaction unit 21 is greater than in other sections in the opposite manner to the twentieth embodiment. According to this embodiment, the activation of the three-way catalyst layer 26 in the downstream section of the reaction unit 21 is advanced. Since the provision of the slits 22 prevents the transmission of the temperature increase in the downstream three-way catalyst 26 to the upstream section, there is no effect on the HC trapping amount of the HC trapping layer 25 upstream.

Figure 27:
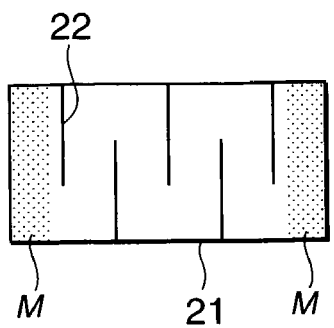
FIG. 27 is a schematic side view of a reaction unit according to a twenty-second embodiment of this invention.

The twenty-second embodiment will be described referring to FIG. 27.

In this embodiment, the catalyst amount M in the three-way catalyst layer 26 is greater in upstream and downstream sections of the reaction unit 21 than in the intermediate section. This embodiment displays the characteristics of both the twentieth and twenty-first embodiments in that the HC oxidizing performance and the activation of the three-way catalyst layer 26 are improved in the upstream and downstream sections of the reaction unit 21. Thus it is possible to optimize the overall temperature environment of such a reaction unit in which the temperature of the intermediate section tends to increase relative to the other sections.

Figure 28:
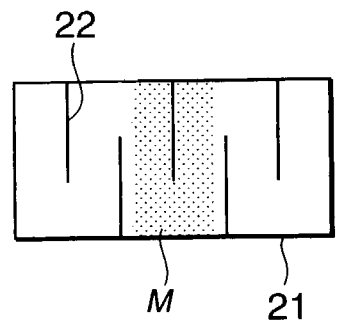
FIG. 28 is a schematic side view of a reaction unit according to a twenty-third embodiment of this invention.

The twenty-third embodiment will be described referring to FIG. 28.

In this embodiment, the catalyst amount M in the three-way catalyst layer 26 is greater in the intermediate section of the reaction unit 21 than in the upstream and downstream sections in the opposite manner to the twenty-second embodiment. This embodiment promotes the HC oxidizing performance and the activation of the three-way catalyst layer 26 in the intermediate section of the reaction unit 21. Thus it is possible to optimize the overall temperature environment of such a reaction unit in which the temperature of the upstream and downstream sections tend to increase relative to the intermediate section.

The twentieth and the twenty-first embodiments result in opposite effects on the activation of the three-way catalyst layer 26. The twenty-second and twenty-third embodiments result in opposite effects on the activation of the three-way catalyst layer 26. Consequently it is possible to regulate the oxidizing of HC released from the HC trapping layer 25 in order to obtain optimal characteristics in the overall exhaust gas purification system. This is achieved by selectively applying the difference in the catalyst amount in the three-way catalyst layer 26 according to the twentieth to the twenty-third embodiments in response to the differences in the characteristics of the catalytic converters 9-11.

Figure 29:
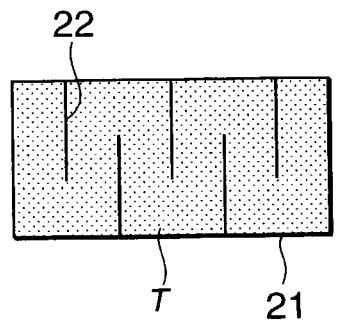
FIG. 29 is a schematic side view of a reaction unit according to a twenty-fourth embodiment of this invention.

The twenty-fourth embodiment will be described referring to FIG. 29.

In this embodiment, the amount T of the HC trapping material coated on the carrier 21A set constant across the entire surface of the carrier 21A. According to this embodiment, it is possible to obtain stable preferred exhaust gas purification performance under various conditions as a result of the creation of turbulent flow by the slits 22 on the flow of exhaust gas and the blocking of heat transfer by the HC trapping layer 25.

Figure 30:
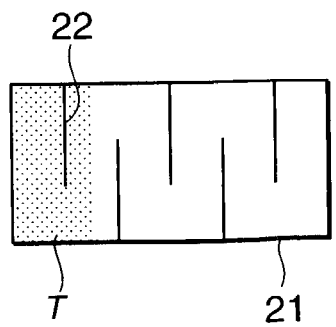
FIG. 30 is a schematic side view of a reaction unit according to a twenty-fifth embodiment of this invention.

The twenty-fifth embodiment will be described referring to FIG. 30.

In this embodiment, the amount T of the HC trapping material coated on the carrier 21A in the upstream section of the reaction unit 21 is greater than in other sections. According to this embodiment, the heat capacity of the HC trapping layer 25 in the upstream section is increased. Thus the increase in the temperature of the HC trapping layer 25 in the upstream section of the reaction unit 21 immediately after starting the engine 1 is delayed. Consequently it is possible to obtain a sufficient temperature increase in the upper layer of the three-way catalyst layer 26 before the trapped HC is released from the HC trapping layer 25. Since the slits prevents the temperature of the three-way catalyst layer 26 in the upstream section from being transmitted the intermediate and downstream sections, the HC trapping performance of the downstream HC trapping layer 25 is not adversely affected.

Figure 31:
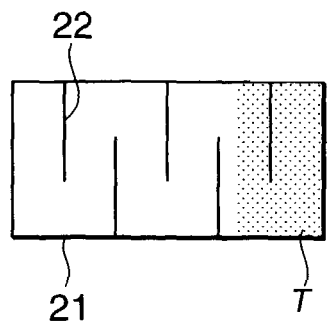
FIG. 31 is a schematic side view of a reaction unit according to a twenty-sixth embodiment of this invention.

The twenty-sixth embodiment will be described referring to FIG. 31.

In this embodiment, the amount T of the HC trapping material coated on the carrier 21A in the downstream section of the reaction unit 21 is greater than in other sections. According to this embodiment, the heat capacity of the HC trapping layer 25 in the downstream section is increased. Thus it is possible to delay the increase in the temperature of the HC trapping layer 25 in the downstream section of the reaction unit 21 in addition to blocking the heat transfer by the slits 22. Consequently it is possible to obtain a sufficient temperature increase in the three-way catalyst layer 26 which is located above the HC trapping layer 25 in the downstream section.

Figure 32:
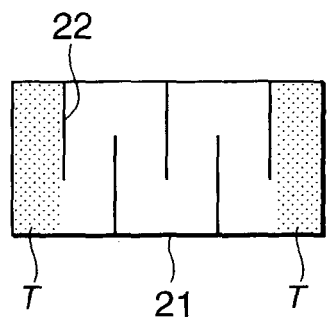
FIG. 32 is a schematic side view of a reaction unit according to a twenty-seventh embodiment of this invention.

The twenty-seventh embodiment will be described referring to FIG. 32.

In this embodiment, the amount T of the HC trapping material coated on the carrier 21A in the upstream and downstream sections of the reaction unit 21 is set to be greater than in the intermediate section. As a result, the heat capacity of the HC trapping layer,25 in the upstream and the downstream sections is increased and the temperature increase of the HC trapping layer 25 in these sections is delayed.

Figure 33:
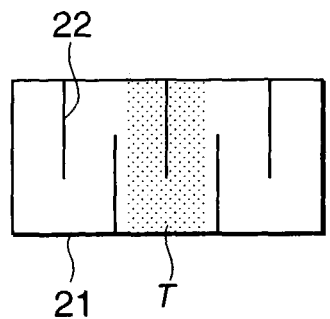
FIG. 33 is a schematic side view of a reaction unit according to a twenty-eighth embodiment of this invention.

A twenty-eighth embodiment will be described referring to FIG. 33.

In this embodiment, the amount T of the HC trapping material coated on the carrier 21A in the intermediate section of the reaction unit 21 is set to be greater than in the upstream and downstream sections in the opposite manner to the twenty-seventh embodiment. As a result, the heat capacity of the HC trapping layer 25 in the intermediate section is increased and the temperature increase of the HC trapping layer 25 in this section is delayed.

The twenty-fifth through twenty-sixth embodiments result in opposite effects on the temperature increase of the HC trapping layer 25. The twenty-seventh and twenty-eighth embodiments result in opposite effects on the temperature increase of the HC trapping layer 25. Consequently it is possible to regulate the release timing of HC from the HC trapping layer 25 in order to obtain optimal characteristics in the overall exhaust gas purification system. This is achieved by selectively applying the differences in the amount T of the trapping material coated on the carrier 21A according to the twenty-fifth to the twenty-eighth embodiments in response to the differences in the characteristics of the catalytic converters 9-11.

As described above, this invention allows for respective variations in the shape or angle of the slits 22, the width of the slits 22 or the interval of the slits 22 as well as the variations in the amount of catalyst or HC trapping material provided in the reaction unit 21. Furthermore these variations can be combined.

FIGS. 34-43 show the twenty-ninth through the thirty-seventh embodiments in which such combinations are described.

Figure 34:
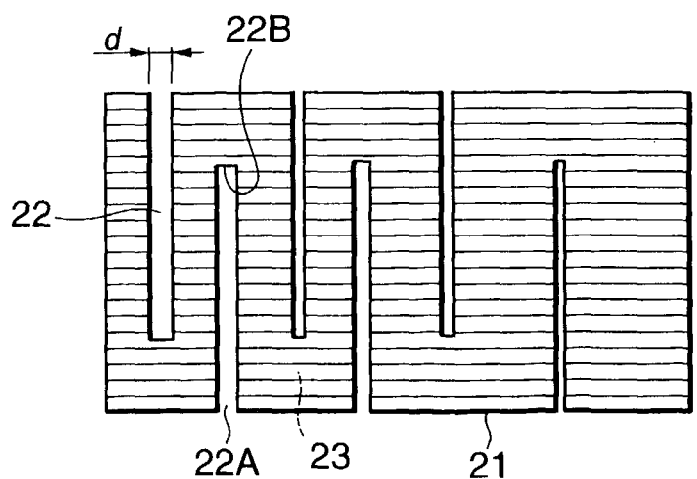
FIG. 34 is a schematic side view of a reaction unit according to a twenty-ninth embodiment of this invention.
Figure 35:
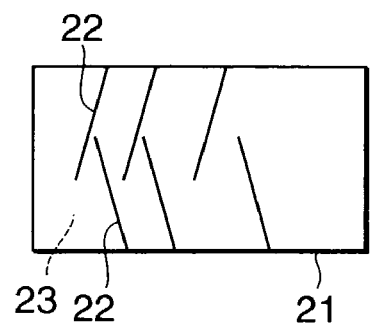
FIG. 35 is a schematic side view of a reaction unit according to a thirtieth embodiment of this invention.
Figure 36:
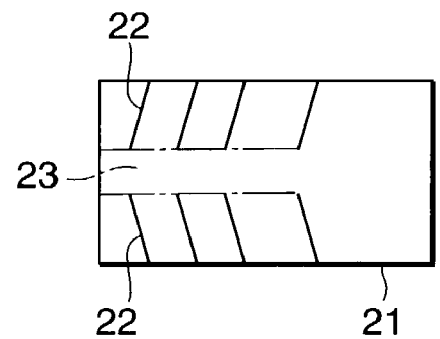
FIG. 36 is a schematic side view of a reaction unit according to a thirty-first embodiment of this invention.
Figure 37:
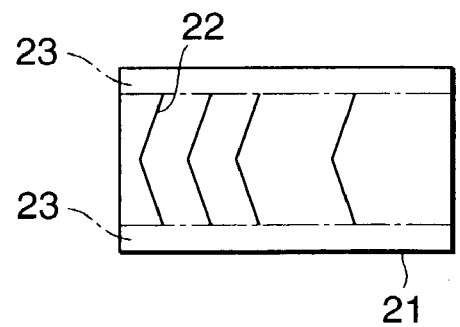
FIG. 37 is a schematic side view of a reaction unit according to a thirty-second embodiment of this invention.
Figure 38:
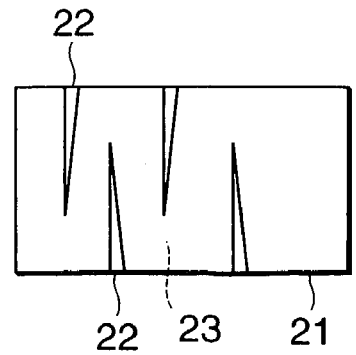
FIG. 38 is a schematic side view of a reaction unit according to a thirty-third embodiment of this invention.
Figure 39:
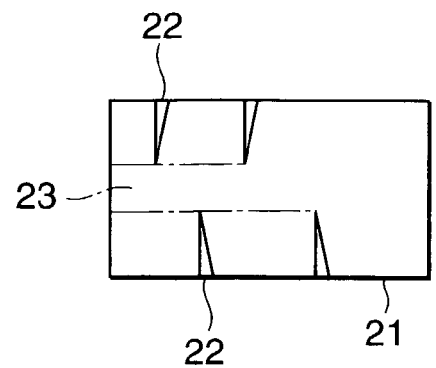
FIG. 39 is a schematic side view of a reaction unit according to a thirty-fourth embodiment of this invention.
Figure 40:
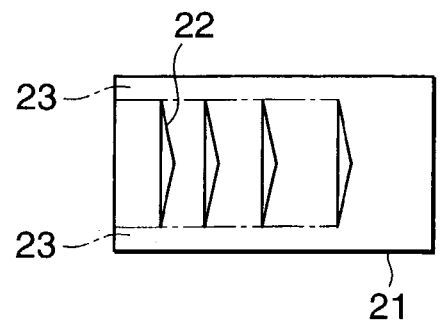
FIG. 40 is a schematic side view of a reaction unit according to a thirty-fifth embodiment of this invention.
Figure 41:
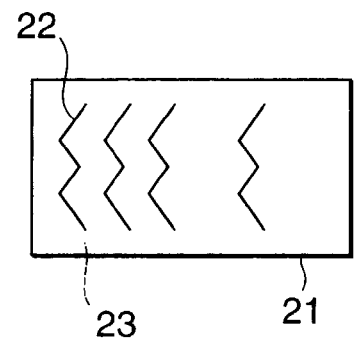
FIG. 41 is a schematic side view of a reaction unit according to a thirty-sixth embodiment of this invention.
Figure 42:
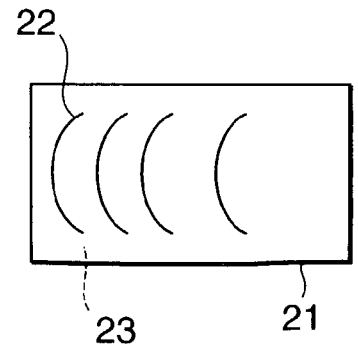
FIG. 42 is a schematic side view of a reaction unit according to a thirty-seventh embodiment of this invention.

The twenty-ninth embodiment shown in FIG. 34 corresponds to the combination of the second embodiment and the sixth embodiment. The thirtieth embodiment shown in FIG. 35 corresponds to the combination of the second embodiment and the eleventh embodiment. The thirtieth-first embodiment shown in FIG. 36 corresponds to the combination of the second embodiment and the twelfth embodiment. The thirty-second embodiment corresponds to the combination of the second embodiment and the thirteenth embodiment. The thirty-third embodiment shown in FIG. 38 corresponds to the combination of the second embodiment and the fourteenth embodiment. The thirty-fourth embodiment shown in FIG. 39 corresponds to the combination of the second embodiment and the fifteenth embodiment. The thirty-fifth embodiment shown in FIG. 40 corresponds to the combination of the second embodiment and the sixteenth embodiment. The thirty-sixth embodiment shown in FIG. 41 corresponds to the combination of the second embodiment and the seventeenth embodiment. The thirty-seventh embodiment shown in FIG. 42 corresponds to the combination of the second embodiment and the eighteenth embodiment.

Figure 43:
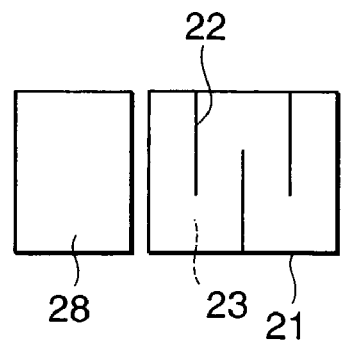
FIG. 43 is a schematic side view of a reaction unit according to a thirty-eighth of this invention.

A thirty-eighth embodiment of this invention will be described referring to FIG. 43.

In this embodiment, an independent HC trap 28 is disposed upstream of the reaction unit 21. The HC trap 28 and the reaction unit 21 are accommodated in the same housing 34 of the catalytic converter 9 shown in FIG. 5. The HC trap 28 comprises a coating of HC trapping material onto the carrier which is formed in the same manner as the carrier 21A of the reaction unit 21. However the slits are not provided in the carrier of the HC trap 28. In this embodiment, the HC trap 28 displays a high HC trapping performance since the HC trap 28 which is detached from the reaction unit 21 is not affected at all by temperature increases in the reaction unit 21.

As a variation on this embodiment, it is possible to provide an independent three-way catalyst unit upstream of the reaction unit 21 instead of the HC trap 28. The three-way catalyst unit is a unit in which a coating of a metallic catalyst instead of the HC trapping material in the HC trap 28. The three-way catalyst unit which is positioned upstream undergoes rapid increases in temperature. Thus it is possible to advance oxidizing operations on HC which undergoes backflow from the HC trapping layer 25 downstream as a result of pulsation of the exhaust gas in the engine 1. The space between the reaction unit 21 and the three-way catalyst unit allows for diffusion of HC over the entire surface of the three-way catalyst unit as a result of diffusion of backflowing exhaust gas.

Figure 44:
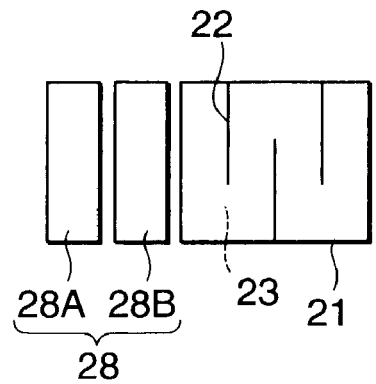
FIG. 44 is a schematic side view of a reaction unit according to a thirty-ninth embodiment of this invention.

A thirty-ninth embodiment of this invention will be described referring to FIG. 44.

In this embodiment, the HC trap 28 in the thirty-eighth embodiment is divided into a first unit 28A and a second unit 28B. The first unit 28A is disposed at a slight interval upstream of the second unit 28B. According to this embodiment, in addition to the effect of the twenty-eighth embodiment, the HC trapping performance of the HC trap 28 is improved and the release of trapped HC can be delayed. This is due to blocking effect on heat transfer in the HC trap 28 and the creation of turbulent flow due to the space between the units 28A and 28B.

FIGS. 45-50 show the fortieth through the forty-fifth embodiments of this invention which are related to the coating of a three-way catalyst or a HC trapping material on the reaction unit 21.

Figure 45:
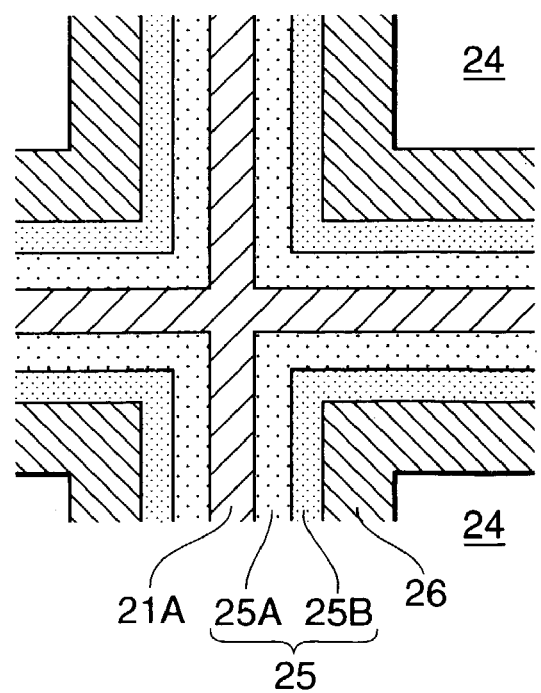
FIG. 45 is similar to FIG. 4, but shows a fortieth embodiment of this invention.

In the fortieth embodiment as shown in FIG. 45, the HC trapping layer 25 coated onto the carrier 21A comprises a lower layer 25A and an upper layer 25B which display different characteristics.

Figure 46:
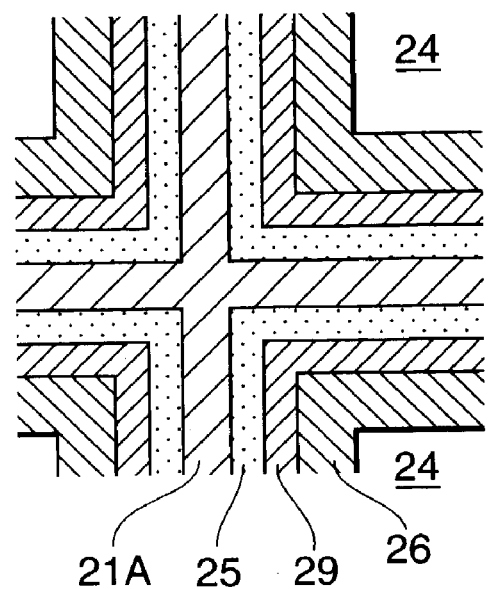
FIG. 46 is similar to FIG. 4, but shows a forty-first embodiment of this invention.

In the forty-first embodiment as shown in FIG. 46, a heat insulation layer 29 comprising aluminum is provided between the HC trapping layer 25 and the three-way catalyst layer 26. The heat insulation layer 29 blocks the heat transfer from the catalyst layer 26 to the HC trapping layer 25. Consequently it is possible to activate the three-way catalyst layer 26 rapidly while maintaining the trapped amount of HC.

Figure 47:
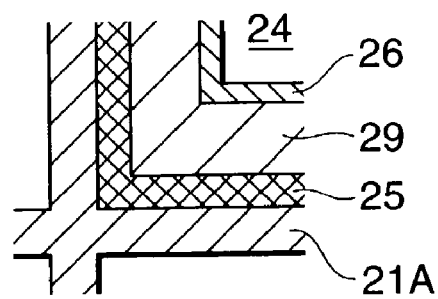
FIG. 47 is similar to FIG. 4, but shows a forty-second embodiment of this invention.

In the forty-second embodiment as shown in FIG. 47, the thickness of the heat insulation layer 29 in the upstream section of the reaction unit 21 is set to be thicker than the downstream section or the intermediate section. Although the upstream section of the heat insulation layer 29 is particularly liable to be affected by the heat of reaction of the three-way catalyst layer 26 or the high-temperature exhaust gas, it is possible to suppress temperature increases in the upstream section of the HC trapping layer 25 by increasing the thickness of the upstream section of the heat insulation layer 29.

Figure 48:
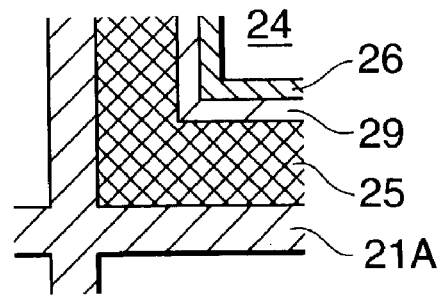
FIG. 48 is similar to FIG. 4, but shows a forty-third embodiment of this invention.

In the forty-third embodiment as shown in FIG. 48, the thickness of the HC trapping layer 25 relative to the thickness of the three-way catalyst layer 26 is increased in the upstream section of the reaction unit 21. In this embodiment, since the heat capacity of the upstream section of the HC trapping layer 25 in the reaction unit 21 is increased, it is possible to delay temperature increases in the entire HC trapping layer 25.

Figure 49:
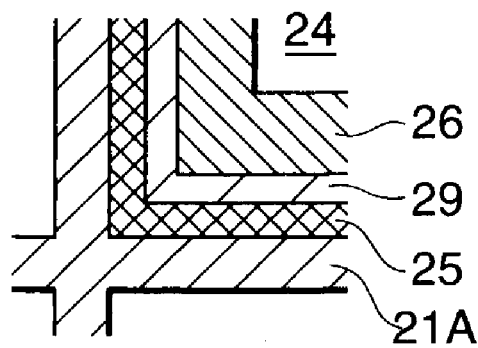
FIG. 49 is similar to FIG. 4, but shows a forty-fourth embodiment of this invention.

In the forty-fourth embodiment as shown in FIG. 49, the thickness of the three-way catalyst layer 26 relative to the thickness of the HC trapping layer 25 is increased in the downstream section of the reaction unit 21. According to this embodiment, since there is an increase in the amount of three-way catalyst in the downstream section, where the temperature increase is delayed, poor HC oxidation performance in the downstream section during the cold-start of the engine 1 can be compensated.

Figure 50:
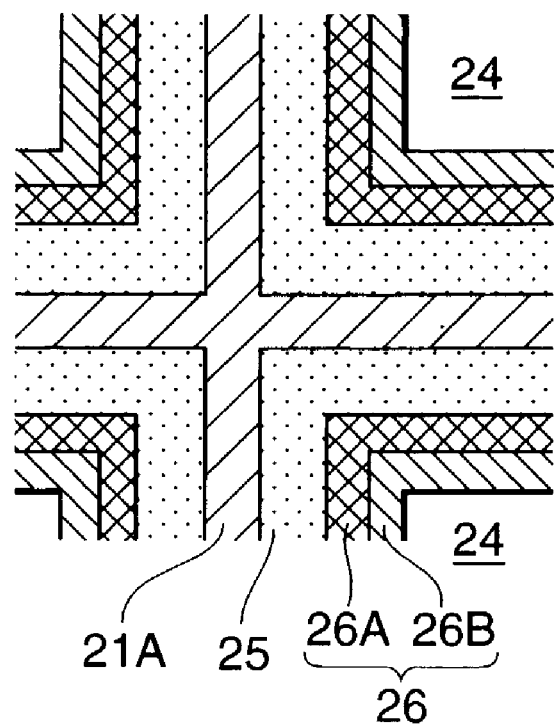
FIG. 50 is similar to FIG. 4, but shows a forty-fifth embodiment of this invention.

In the forty-fifth embodiment as shown in FIG. 50, the three-way catalyst layer 26 comprises a lower layer 26A and an upper layer 26B which display different characteristics. For example, the situation is considered in which palladium (Pd) is applied to the lower layer 26A and any one of palladium/rhodium (Pd/Rd), platinum/rhodium (Pt/Rh) or a relatively low density of rhodium (Rd) is applied to the upper layer 26B. It is known that palladium (Pd) can be activated at lower temperature than platinum (Pt) or rhodium (Rd), but in view of reduction of nitrogen oxides (NOx) at normal operation temperature, platinum (Pt) or rhodium (Rd) shows better performance than palladium (Pd).

By applying the above combination to the three-way catalyst layer 26, high HC oxidation performance at low temperature can be achieved while maintaining NOx reduction performance at normal operation temperature.

The drawings for each of the above embodiments have been provided for the purpose of describing the respective characteristics in a graphical manner. Consequently the actual structure is not always shown with respect to dimensions such as the interval or the width of the slits 22.

The contents of Tokugan 2002-122117 and 2002-122118, both with a filing date of Apr. 24, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A hydrocarbon trapping device which is interposed in an exhaust passage of a combustion engine and traps hydrocarbons contained in exhaust gas from the engine in a predetermined temperature range, comprising:
    a housing comprising an inlet and an outlet for exhaust gas;
    a carrier disposed in the housing and forming a plurality of passages for exhaust gas which flows from the inlet to the outlet, a slit being formed in the carrier in a direction across the passages; and
    a hydrocarbon trapping layer formed on the carrier;
    wherein the carrier is provided with a plurality of slits, and
    wherein the plurality of slits comprise slits having different dimensions with respect to a flow direction of exhaust gas in the passages.

2. A hydrocarbon trapping device which is interposed in an exhaust passage of a combustion engine and traps hydrocarbons contained in exhaust gas from the engine in a predetermined temperature range, comprising:
    a housing comprising an inlet and an outlet for exhaust gas;
    a carrier disposed in the housing and forming a plurality of passages for exhaust gas which flows from the inlet to the outlet, a slit being formed in the carrier in a direction across the passages; and
    a hydrocarbon trapping layer formed on the carrier;
    wherein the carrier is provided with a plurality of slits, and
    wherein the plurality of slits comprise a pair of notches, each notch having an opening on an outer periphery of the carrier and a bottom on the inner side of the carrier, and the openings of the pair of the notches are directed to opposite directions.

3. A hydrocarbon trapping device which is interposed in an exhaust passage of a combustion engine and traps hydrocarbons contained in exhaust gas from the engine in a predetermined temperature range, comprising:
    a housing comprising an inlet and an outlet for exhaust gas;
    a carrier disposed in the housing and forming a plurality of passages for exhaust gas which flows from the inlet to the outlet, a slit being formed in the carrier in a direction across the passages; and
    a hydrocarbon trapping layer formed on the carrier;
    wherein the trapping device further comprises a three-way catalyst layer formed on the hydrocarbon trapping layer, and
    wherein an amount of catalyst in the three-way catalyst layer varies in response to a distance from the inlet.

4. A hydrocarbon trapping device which is interposed in an exhaust passage of a combustion engine and traps hydrocarbons contained in exhaust gas from the engine in a predetermined temperature range, comprising:
    a housing comprising an inlet and an outlet for exhaust gas;
    a carrier disposed in the housing and forming a plurality of passages for exhaust gas which flows from the inlet to the outlet, a slit being formed in the carrier in a direction across the passages; and
    a hydrocarbon trapping layer formed on the carrier;
    wherein an amount of the hydrocarbon trapping layer formed on the carrier is varied in response to a distance from the inlet.

* * * * *